United States Patent [19]
Yamamoto

[11] Patent Number: 4,998,680
[45] Date of Patent: Mar. 12, 1991

[54] WEBBING DRIVE APPARATUS FOR A SEAT BELT SYSTEM

[75] Inventor: Toshimasa Yamamoto, Aichi, Japan

[73] Assignee: Kabushiki Kaisha Toaki-Rika-Denki-Seisakusho, Aichi, Japan

[21] Appl. No.: 423,332

[22] Filed: Oct. 18, 1989

[30] Foreign Application Priority Data

Oct. 18, 1988 [JP] Japan .................. 63-135774[U]
Oct. 18, 1988 [JP] Japan .................. 63-140881[U]

[51] Int. Cl.⁵ .................. B60R 22/34; B60R 21/10
[52] U.S. Cl. .................. 242/54 R; 242/54 A; 242/107; 280/802; 280/804
[58] Field of Search .......... 242/54 R, 54 A, 77.1, 242/107; 280/802, 804, 808

[56] References Cited

U.S. PATENT DOCUMENTS

| | | | |
|---|---|---|---|
| 2,343,684 | 3/1944 | Mace | 242/54 A |
| 3,016,206 | 1/1962 | Cone | 242/54 A |
| 4,410,202 | 10/1983 | Takada . | |
| 4,436,250 | 3/1984 | Becker | 242/54 R |
| 4,703,949 | 11/1987 | Fohl . | |
| 4,736,901 | 4/1988 | Betencourt | 280/804 X |
| 4,852,908 | 8/1989 | Nishimura | 280/804 |

*Primary Examiner*—Stuart S. Levy
*Assistant Examiner*—Steven M. duBois
*Attorney, Agent, or Firm*—Sixbey, Friedman, Leedom & Ferguson

[57] ABSTRACT

A webbing drive apparatus for a seat belt system which is adapted to fasten a webbing, that is retained by a wire, around a seat occupant of a vehicle or cancelling the application thereof by taking up the wire onto an outer periphery of a rotating drum or paying out the wire from the outer periphery. A guide portion for accommodating and guiding the movement of the paid-out wire is provided in a cover for covering the drum. Accordingly, the wire, when paid out, is moved along the guide section.

20 Claims, 7 Drawing Sheets

WEBBING DRIVE APPARATUS FOR A SEAT BELT SYSTEM

BACKGROUND OF THE INVENTION

1. Field of the Invention

The present invention relates to a webbing drive apparatus for a seat belt system which is adapted to drive a webbing for restricting a seat occupant of a vehicle so as to automatically fasten the webbing to the occupant or cancel the application thereof.

2. Description of the Related Art:

An automatic seat belt system in which the webbing is driven by a webbing drive apparatus for automatically applying a webbing to a seat occupant or cancelling the application thereof after the occupant is seated in a vehicle has been proposed.

A conventionally known webbing driving apparatus is arranged in such a manner that the webbing is driven in the longitudinal direction of the vehicle by means of a wire. In this type of webbing drive apparatus, a drum is rotated by the driving force of a motor to take up the wire onto the drum or pay out the same from the drum. The webbing is then guided by a guide means disposed in the longitudinal direction of the vehicle and is driven in the same direction.

With this drive apparatus, the drum onto which the wire is taken up is completely covered with a cover. The wire is stored inside the cover. This cover is provided with a wire passing port through which the wire, that is being taken up onto the drum or paid out therefrom, passes. The wire is thus adapted to be paid out from the drum or taken up onto it through this passing port.

Formed at the edge of the wire passage port provided in the cover is a projecting portion which projects in the direction in which the wire is paid out. The arrangement is such that the wire is paid out from this projecting portion, and is inserted into a guide means disposed in the longitudinal direction of the vehicle.

However, with the above-described webbing drive apparatus, there is a drawback in that when the wire is paid out from the drum, the wire being paid out is intermittently brought into contact with an inner wall of the cover and generates noise, thereby imparting discomfort to the occupant.

That is to say, at the time when the wire is taken up spirally onto the drum and a portion of the wire in the outermost layer thereof located at one end of the drum is paid out in the paying-out direction through the passage port of the cover, that portion of the wire separates from the outer periphery of the drum and is then driven in sliding contact with the inner wall surface of the cover before it is paid out through the passage port. However, the portion of the wire paid out from inside the cover is subjected to a compressive load by means of sliding resistance or the like caused by the guiding means. The result is that the wire can buckle inside the cover, becoming deformed in the same direction as the axial direction of the drum. If the wire is further paid out in this state in which buckling has occurred, the wire moves impulsively in the direction opposite to the direction in which it has become deformed by buckling. In consequence, the wire is brought into contact with the inner wall surface, particularly the inner wall surface opposing the end surface of the drum, and this results in the so-called spring-back phenomenon occurs which generates noises. When this spring-back phenomenon occurs intermittently as the wire is further paid out, the resulting intermittent noises impart discomfort to the vehicle occupant.

SUMMARY OF THE INVENTION

Accordingly, an object of the present invention is to provide a webbing drive apparatus for a seat belt system which is capable of allowing a wire that is taken up onto a drum to be said out from inside a cover without buckling at the time of the paying out of the wire.

To this end, in accordance with the present invention, there is provided a webbing drive apparatus for a seat belt system which is adapted to drive a webbing to be worn by a seat occupant of a vehicle so as to fasten the webbing around the occupant or cancel the application thereof, comprising: a wire for retaining the webbing; a drum for taking up or paying out the wire as the drum rotates so as to drive the webbing via the wire; a cover for covering the drum; and guide means which, when the wire is paid out, is adapted to accommodate therein a portion of the wire separated from the drum and guide the wire along a predetermined direction outwardly from the cover.

In the present invention having the above-described arrangement, at the time of paying out the wire by the rotation of the drum, the portion of the wire which has become separated from the drum is accommodated in the guide means and guided in a predetermined direction. It is then paid out of the cover. Since the wire is guided in a predetermined direction, the wire is prevented from buckling or being bent inside the cover. The so-called springing-back phenomenon is thereby prevented from occurring.

The above and other objects, features and advantages of the present invention will become more apparent from the following detailed description of the invention when read in conjunction with the accompanying drawings.

BRIEF DESCRIPTION OF THE DRAWINGS

FIGS. 1 to 3 illustrate a first embodiment of the present invention, in which

FIGS. 5 and 6 illustrate a third embodiment of the present invention, in which

DESCRIPTION OF THE PREFERRED EMBODIMENTS

Referring now to the accompanying drawings, a description will be given of the preferred embodiment of the present invention.

First Embodiment

Figure 7:
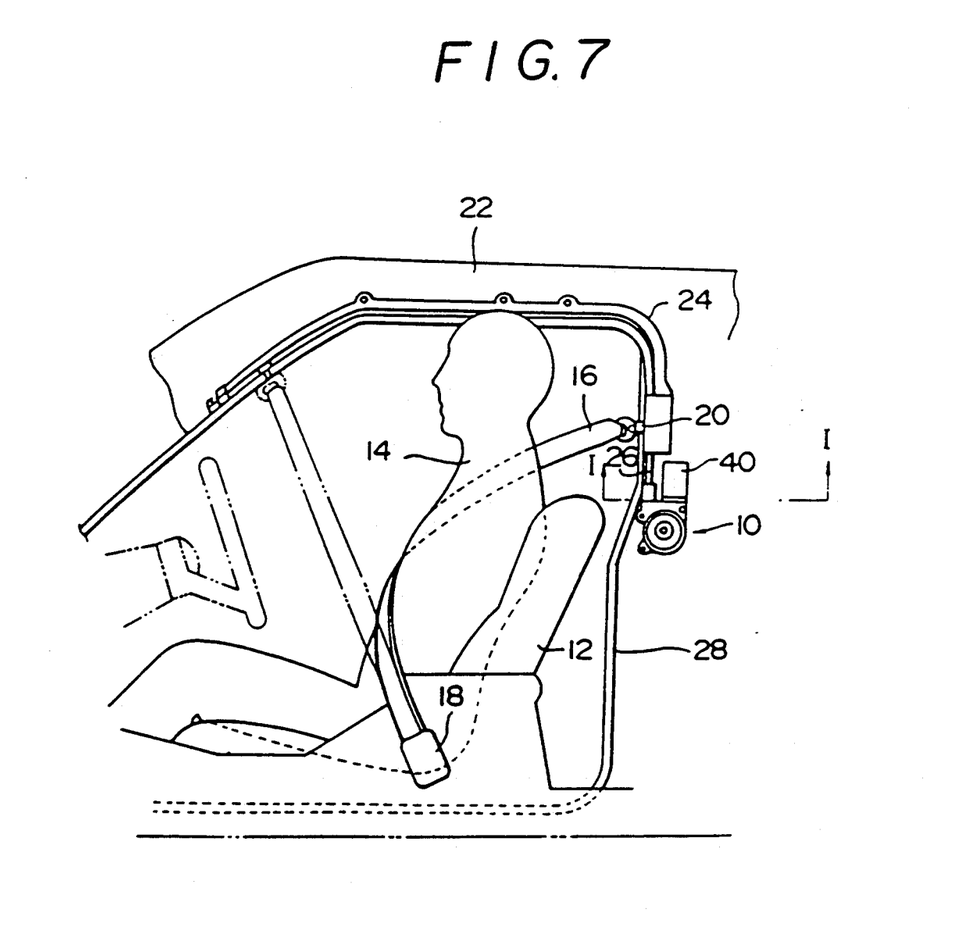
FIG. 7 illustrates an automatic seat belt system employing a webbing drive apparatus in accordance with the present invention.

FIG. 7 illustrates an automatic seat belt system employing a webbing drive apparatus 10 in accordance with a first embodiment of the present invention.

This automatic seat belt system is so arranged that a webbing 16 is automatically fastened around a seat occupant 14 who is seated in a seat 12. One end of this webbing 16 is taken up onto a take-up apparatus 18 which is disposed in a substantially central portion of the vehicle. The take-up apparatus 18 incorporates an inertia lock mechanism for stopping the drawing out of the webbing 16 when the vehicle is decelerated suddenly.

A slider 20 is attached to a tip end of the webbing 16 down out from the take-up apparatus 18. The slider 20 is adapted to move along a roof side rail 22 of the vehicle by being guided by a guide rail 24 laid in the longitudinal direction of the vehicle. One end of a wire 26 (shown in FIG. 1) is connected to the slider 20. The slider 20 is adapted to move in the longitudinal direction of the vehicle along the guide rail 24 via the wire 26 by means of the webbing drive apparatus 10 disposed in an intermediate portion of a center pillar 28. As shown in FIG. 7, in a state in which the slider 20 is located at the rear end of the guide rail 24, i.e., on the rear side of the vehicle, the webbing 16 is in the state of being fastened around an occupant 14. In a state in which the slider 20 is located at the front end of the guide rail 24, as indicated by a two-dot chain line, the webbing 16 is in the state in which it can be removed from the occupant 14. Between the slider 20 and the webbing driving apparatus 10, the wire 26 is closely accommodated in a tube 30 (see FIG. 2) which is interposed between the end of the guide rail 24 and the webbing driving apparatus 10 and is movable in the longitudinal direction of the tube 30. This tube 30 may be formed of a flexible material.

Figure 1:
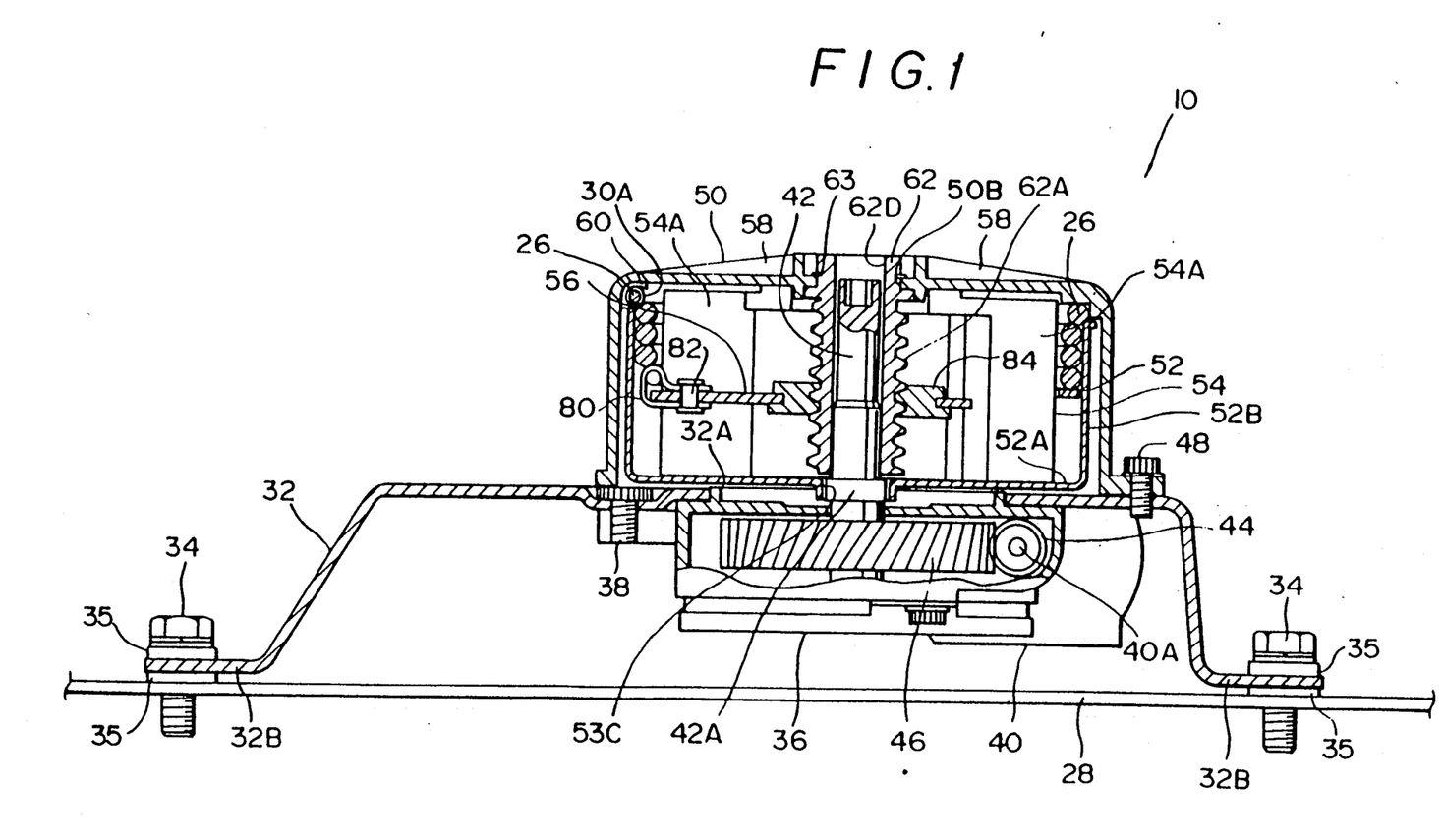
FIG. 1 is a cross-sectional view taken along the line I—I of FIG. 7, illustrating an assembled state of a webbing drive apparatus in accordance with a first embodiment of the present invention.
Figure 2:
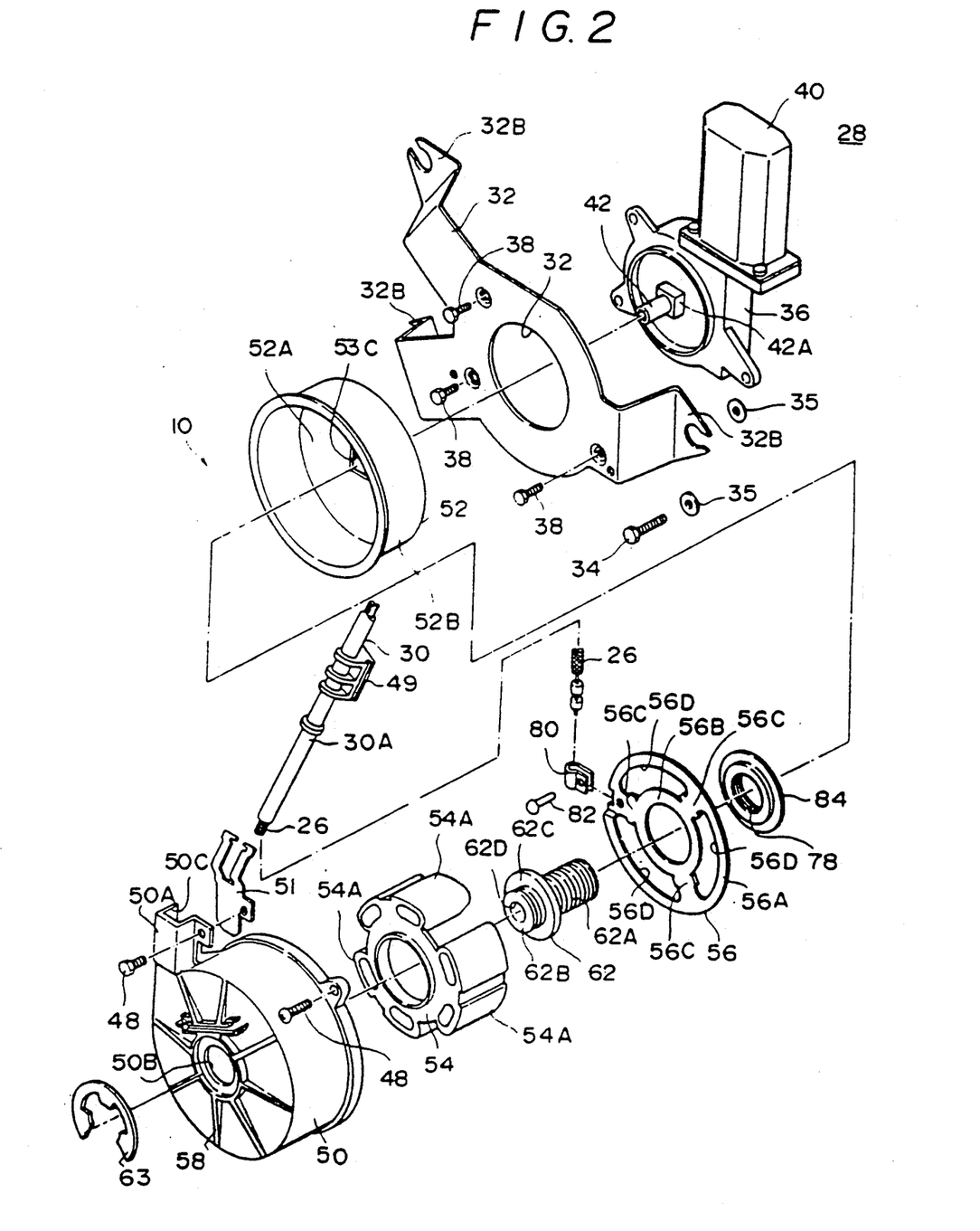
FIG. 2 is an exploded perspective view of the webbing drive apparatus.

The webbing driving apparatus 10 has a base plate 32, as shown in FIGS. 1 and 2. The base plate 32 has a circular hole 32A provided in a substantially central portion thereof, and three leg plates 32B are formed in a bent form in a peripheral portion of the base plate 32. The distal ends of these leg plates 32B are respectively secured to the center pillar 28 by bolts 34 via washers 35.

Figure 3:
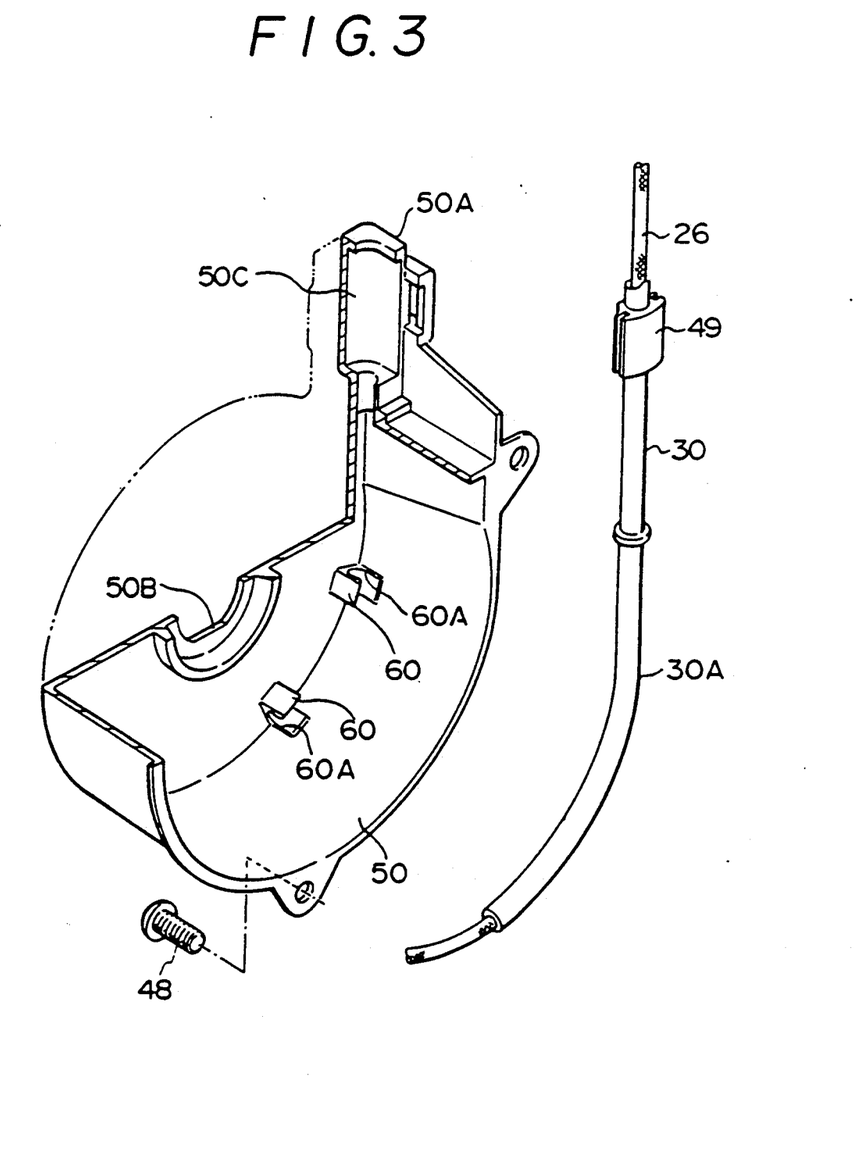
FIG. 3 is a partly sectional perspective view illustrating the interior of the cover.

A gear box 36 is attached to a substantially central portion of the base plate 32 between the base plate 32 and the center pillar 28 via bolts 38. A motor, 40 as shown in FIG. 3, is fixed to the gear box 36, and a rotating shaft 42 is projectingly provided in the gear box 36 in such a manner as to be rotatable.

The motor 40 is connected to an unillustrated switch for detecting the getting in/out of the occupant 14 and is actuated when the occupant gets in or out of the vehicle. With this motor 40, as shown in FIG. 1, a worm gear 44 is coaxially fixed to an output shaft 40A thereof, and the rotating shaft 42 is capable of rotating via the worm gear 44 and the worm wheel 46 meshing therewith.

This rotating shaft 42 passes through the circular hole 32A provided in the base plate 32 and its tip portion projects from the base plate 32 toward a central portion of a vehicle compartment.

Meanwhile, a cover 50 is attached via screws 48 to the side of the base plate 32 which is remote from the side where the gear box 36 is provided. An outer drum 52 and an inner drum 54 are accommodated in the cover 50. A screw plate 56 is interposed between the outer drum 52 and the inner drum 54.

The cover 50 is made of a synthetic resin and, as shown in FIG. 2, is provided with a projecting portion 50A projecting tangentially from a side wall portion thereof. A support portion 50C is formed in this projecting portion 50A, and the arrangement is such that, in a state in which a tip portion 30A of the tube 30 is inserted in the cover 50, an intermediate portion of the tube 30 is accommodated in the support portion 50C and is secured by a bracket 51 via a clamp 49.

A plurality of ribs 58 are formed on the outer side of an end surface of the cover 50 in such a manner as to extend radially from the center.

As shown in FIGS. 1 and 3, two guide portions 60 are projectingly formed on an inner peripheral wall of the cover 50. Each guide portion 60 is formed integrally with the cover 50 and is provided with a support groove 60A having an arcuate sectional configuration. The tip portion 30A of the tube 30 is inserted in these support grooves 50A and clamped and supported therein. The two guide portions 60 are adapted to guide the tip portion 30A along the inner peripheral surface of the cover 50 and support the same to the cover 50.

The wire 26 taken up onto the inner drum 54 is accommodated in the tip portion 30A of the tube 30. The tip portion 30A is inserted in the cover 50 along the inner peripheral wall thereof by about half a circumference thereof. Specifically, the length of this inserted portion is determined by a maximum curvature of the tube 30 and the diameter of the inner drum 54. The tip portion 30A is inserted at least up to a position where a portion of the wire 26, located between the inner drum 54 and an opening of the tip portion 30A, does not buckle during the paying out of the wire 26.

In addition, formed in the end surface of the cover 50 is a hole 50B for supporting the screw 62 adapted to guide and move the screw plate 56 in an axial direction. The screw 62, which is formed of a synthetic resin, as in the case of the cover 50, is provided with an external thread 62A having a large pitch and formed on the outer periphery of the screw 62 extending from one end to a central portion thereof so as to threadingly engage with the screw plate 56. Also, the screw 62 has at its opposite end a circular portion 62B whose outer perihery fits in the hole 50B of the cover 50 and which has an annular groove formed at its end so as to fit a retaining ring 63. A flange 62C is formed between the external thread 62A and the circular portion 62C. The cover 50 and the screw 62 are secured to each other in the following way. The circular portion 62B is inserted through the hole 50B and retained by a retaining ring 63. The flange 62C serves to determine the amount of axial insertion of the screw 62 into the cover 50. In addition, the screw 62 has a through-hole 62D formed along in the axial direction thereof, and the rotating shaft 42 is pressure fit into the through-hole 62D.

The outer drum 52 comprises a circular bottom plate 52A and an annular side plate 52B and is thus formed into the configuration of a cup. A rectangular hole 53C is formed in a central portion of the bottom plate 52A, and a drive portion 42A, having a rectangular section and formed at a tip portion of the rotating shaft 42, is fitted in this rectangular hole 53C. Accordingly, the outer drum 52 is adapted to rotate with the rotating of the rotating shaft 42.

The inner drum 54 is secured to the bottom plate 52A of the outer drum 52 and is rotatable together with the outer drum 52. This inner drum 54 is provided with a disk-like configuration and has around its axis three projecting portions 54A which are substantially fan-shaped and project axially therefrom at substantial equal intervals. The space between these projecting portions 54A and the side plate 52 of the outer drum 52 serves as a space for accommodating the wire 26.

The screw plate 56 is formed by punching out a metal plate and has a large-diameter outer annular portion 56A, a small diameter inner annular portion 56B, and three connecting portions 56C for connecting the annular portions 56A, 56B at equal intervals. In addition, respectively formed between the adjacent connecting portions 56C are three fan-shaped holes 56D, into which the projecting portions 54A of the inner drum 54 are fitted loosely. As for the screw plate 56, the end of the wire 26 is retained at its outer annular portion 56A by means of a rivet 82 via a clamp 80. Meanwhile, the inner annular portion 56B of the screw plate 56 has a synthetic resinmade annular member 84 secured thereto and has a thickness greater than the other portions. An inner thread 78 is provided in an axial portion of the annular member 84 for engagement with the screw 62 that is secured to the cover 50.

Each time the rotating shaft 42 rotates in a forward direction by a one turn, the wire 26 is taken up onto the outer periphery of the inner drum by one circumference, and the screw plate 56 moves axially by the diameter of the wire 26 and is thereby adapted to closely take up the wire 26 onto the outer periphery of the inner drum into the shape of a cylinder. In addition, the interval between the outer drum 52 and the projecting portions 54A of the inner drum 54 in the aforementioned wire accommodating space is set to be not less than the diameter of the wire 26 and less than double that diameter so as to positively effect the paying out of the wire 26.

A description will now be given of the operation of this embodiment.

In a state in which an occupant 14 is not seated in a seat 12, a slider 20 is located at the front end of a guide rail 24, i.e., on the front side of the vehicle, and a webbing 16 is set in the state indiated by the two-dot chain line in FIG. 7.

The occupant 14 can therefore easily get in the vehicle and be seated on the seat 12. When the occupant 14 is seated on the seat 12, an unillustrated switch detects the same. The rotating shaft 42 is then rotated in a forward direction by the motor 40. As a result, the outer drum 52, the inner drum 54, and the screw plate 56 are rotated in a forward direction, thereby allowing the wire 26 to be taken up spirally onto the inner drum 54. Consequently, the slider 20 is moved along the guide rail 24 in the rearward direction of the vehicle, thereby allowing the webbing 16 to be automatically fastened around the occupant 14, as indicated by the solid line in FIG. 7.

Since the take-up apparatus 18 stops the drawing out of the webbing 16 when the vehicle is decelerated suddenly, the occupant 14 is set in a state of being securely restrained by the webbing 16.

When the occupant 14 leaves the vehicle, an unillustrated switch detects the same, and the rotating shaft 42 is rotated in a reverse direction by the motor 40. As a result, the outer drum 52, the inner drum 54, and the screw plate 56 are rotated in a reverse direction allowing the wire 26 to be paid out from the inner drum 54.

Consequently, the slider 20 is moved along the guide rail 24 in the forward direction of the vehicle by means of the wire 26, thereby automatically allowing the webbing 16 to be removed from the occupant 14.

At the time when the wire 26 is paid out from inside the cover 50, the wire 26 is gradually separated from the drum, passes through the tip portion 30A of the tube 30 disposed along the inner peripheral wall of the cover 50, and is driven in the axial direction. Since the movement of the wire 26 inside the cover 50 is restricted by this arrangement, the so-called spring-back phenomenon of the wire 26 is prevented from occurring. The wire 26 is therefore prevented from intermittently abutting against the inner wall of the cover 50, and thereby prevented from generating noises. In other words, when the wire 26, that is taken up onto the inner drum 54, is paid out, sliding resistance takes place inside the tube 30, and the wire 26 is subjected to a buckling load at the portion being paid out from the cover 50. However, since the arrangement is such that, at the time when the wire 26 is paid out by the rotation of the inner drum 54, the wire 26 which is accommodated in the tip portion 30A is gradually separated from the outer periphery of the inner drum 54 and paid out from inside the cover 50. It therefore becomes possible to prevent the deformation of the wire 26 inside the cover 50 due to the buckling load.

Thus, in accordance with the present invention, since the wire 26 is paid out in the state in which it is accommodated in the tip portion 30A of the tube 30, the wire 26 is prevented from buckling inside the cover due to sliding resistance. Consequently, the wire 26 is not intermittently brought into contact with the inner wall of the cover 50, with the result that abutting noises are not generated.

Second Embodiment

Figure 4:
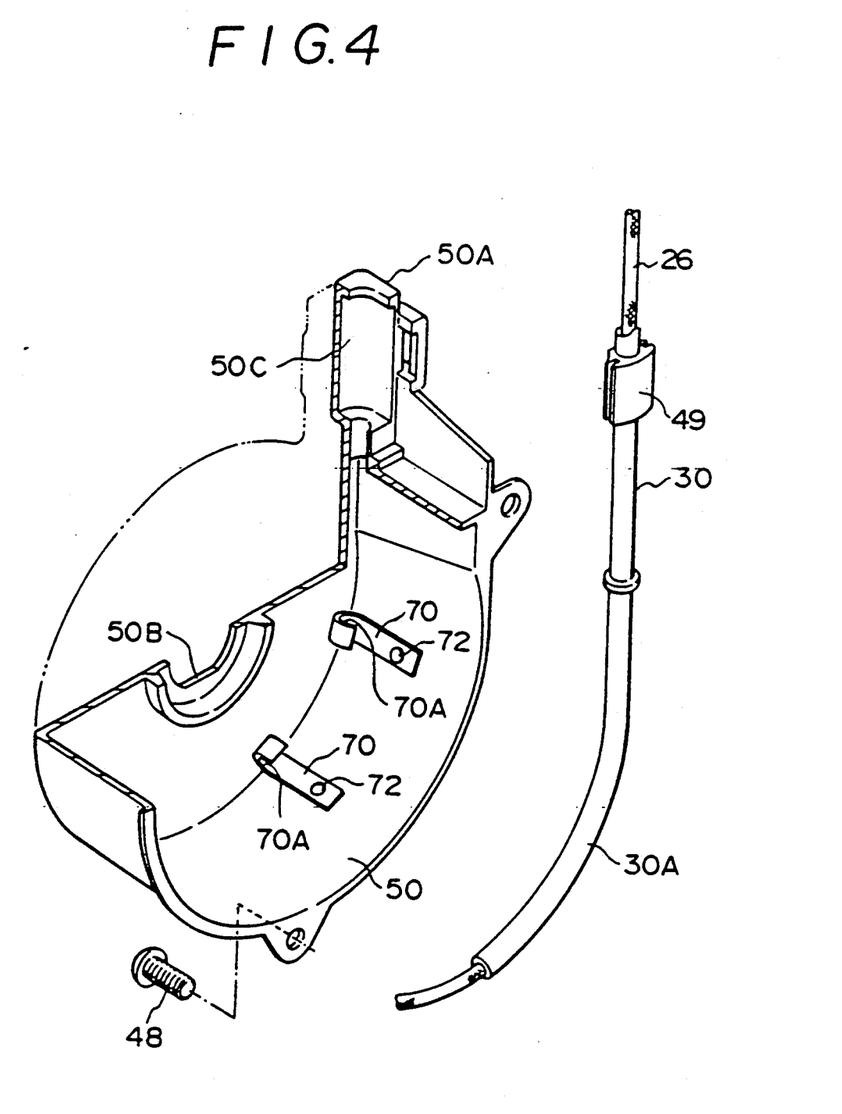
FIG. 4 is a partly sectional perspective view illustrating a second embodiment of the present invention and corresponding to FIG. 3.

Referring now to FIG. 4, a description will be given of a second embodiment of the present invention. In this embodiment, components or portions that are identical with or correspond to those of the first embodiment are denoted by the same reference numerals, and a description thereof will be omitted.

In the second embodiment, the arrangement is such that the guide portions 60, which, in the first embodiment were used for securing the tip portion 30A of the tube 30, by inserting the tip portion 30A through the cover 50, and into the inner peripheral wall of the cover 50, are formed separately from the cover 50.

As shown in FIG. 4, two guide plates 70 are respectively secured to the inner peripheral wall of the cover 50 by means of rivets 72. One end of this guide plate 70 is bent into an arcuate configuration so as to form a tube supporting portion 70A into which the tip portion 30A is inserted. This guide plate 70 is adapted to guide the tip portion 30A of the tube 30 along the inner peripheral wall of the cover 50 and to secure the same to the cover 50. Accordingly, when the wire 26 taken up onto the inner drum 54 is paid out, the wire 26 after being gradually separated from the inner drum 54, is accommodated in the tip portion 30A of the tube 30 and is driven in the axial direction. As a result, since the wire 26 is prevented from buckling and being intermittently brought into contact with the inner wall of the cover 50, noises are not generated.

In the foregoing embodiments, the tip portion 30A of the tube 30 is a cylindrical body. However, the present invention is not restricted to the same, and any arrangement may be adopted insofar as it is disposed in the cover 50 and is adapted to accommodate the wire 26 and guide the same in the axial direction.

In the foregoing embodiments, the tip portion 30A of the tube 30 is supported to the inner peripheral wall of the cover 50 by means of guide portions 60 or guide plates 70. However, the present invention is not restricted to the same, and the tube 30 may be supported outwardly of the cover 50. Furthermore, an arrangement may be provided such that by forming the cylindrical body with a highly rigid material, the wire 26 is guided in the axial direction by being simply inserted into the cover 50 and without being supported on the cover 50.

Third Embodiment

Figure 5:
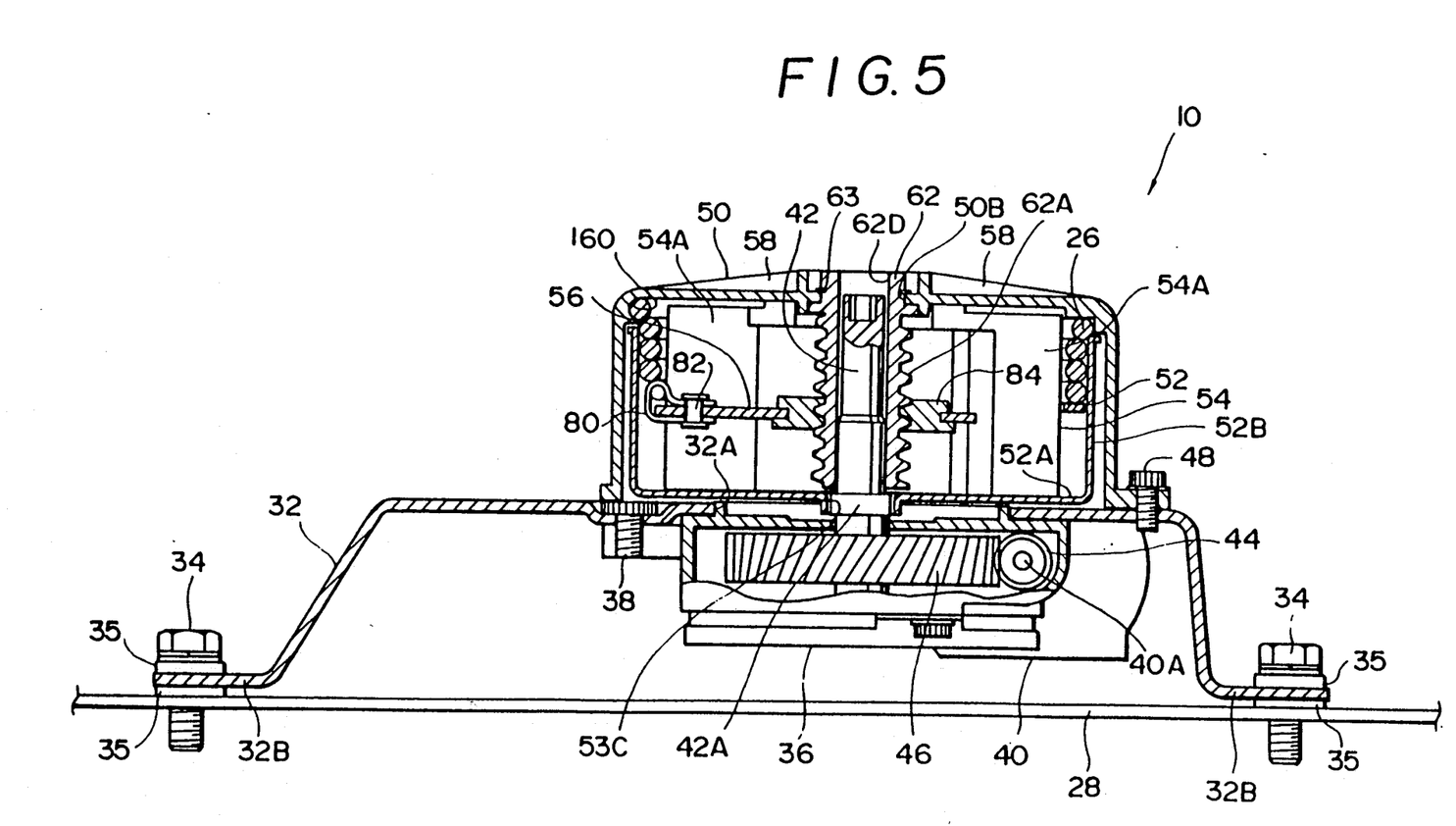
FIG. 5 is a cross sectional view corresponding to FIG. 1.

Referring now to FIG. 5, a description will be given of a third embodiment of the present invention. In this embodiment, components or portions that are identical with or correspond to those of FIGS. 1 and 2 are denoted by the same reference numerals, and a description thereof will be omitted.

Figure 6:
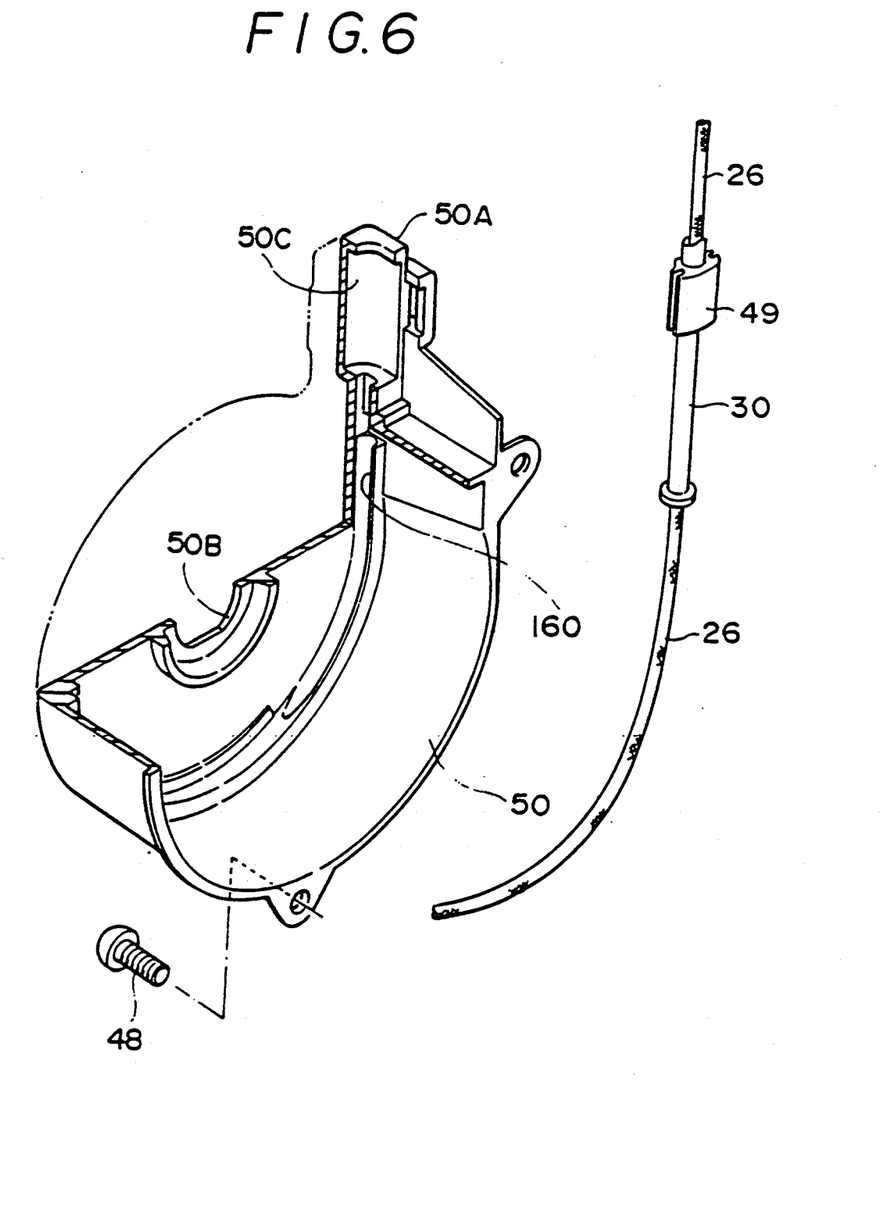
FIG. 6 is a perspective view illustrating the interior of the cover and corresponding to FIG. 3.

In this embodiment, as shown in FIGS. 5 and 6, a groove 160 is formed on the inner wall of the cover at a paying-out portion thereof for paying out the wire 26. This grooves 160 has an arcuate section to allow the wire 26 to move along the inner wall of the cover 50. Consequently, the arrangement is such that at the time when it is paid out, the wire 26 is accommodated in this groove 160 and is thereby guided in its axial direction and is paid out of the cover 50 with its movement in the same direction as the axial direction of the outer drum 52 being restricted. As shown in FIG. 6, this groove 160 is provided by about half a circumference along the inner wall of the cover 50. This groove 160 is formed in such a manner that its bottom becomes gradually shallow starting from the projecting portion 50 side along the wire taking-up direction.

Since the other arrangements are identical with those of the first and second embodiments, a description thereof will be omitted.

A description will not be given of the operation of this embodiment.

When the occupant 14 leaves the vehicle, an unillustrated switch detects the same, and the rotating shaft 42 is rotated in a reverse direction by the motor 40. As a result, the outer drum 52, the inner drum 54, and the screw plate 56 are rotated in a reverse direction, allowing the wire 26 to be paid out from the inner drum 54.

Consequently, the slider 20 is moved along the guide rail 24 in the forward direction of the vehicle by means of the wire 26, thereby automatically allowing the webbing 16 to be removed from the occupant 14.

At the time when the wire 26 is paid out from inside the cover 50, the wire 26 is gradually separated from the drum, is accommodated in the groove 160 provided in the cover 50, and its movement, in the same direction as the axial direction of the outer drum 52, is restricted. Accordingly, the so-called spring-back phenomenon of the wire 26 is prevented from occurring, and the wire is therefore prevented from intermittently abutting against the inner wall of the cover 50, thereby preventing the generation of noises. In other words, when the wire 26 taken up onto the inner drum 54 is paid out, sliding resistance takes place inside the tube 30, and the wire 26 is subjected to a buckling load at the portion being paid out from the cover 50. However, since the arrangement is such that, at the time when the wire 26 is paid out by the rotation of the inner drum 54, the wire 26 is gradually separated from the outer periphery of the inner drum 54 and is accommodated in the groove 160. Consequently, since the wire 26 is paid out from inside the cover 50 in a state in which it is accommodated in the groove 160, it is possible to prevent the deformation of the wire 26 in the axial direction of the outer drum 52 due to the buckling load.

Thus, in accordance with the present invention, since the wire 26 is paid out in the state in which it is accommodated in the groove 160 at the time of paying out, the wire 26 is prevented from buckling inside the cover due to sliding resistance. Consequently, the wire 26 is not intermittenly brought into contact with the inner wall of the cover 50, with the result that there are no abutting noises.

What is claimed is:

1. A webbing drive apparatus for a seat belt system used to drive a webbing to be worn by a seat occupant of a vehicle so as to fasten the webbing around the occupant or cancel the application thereof, comprising:
   a wire for retaining said webbing;
   a drum assembly for taking up or reeling out said wire during rotation of said drum assembly so as to drive said webbing by said wire;
   a cover for covering said drum assembly, said cover including a top plate with a depending side wall and a projection with an opening through which said wire movably passes;
   guide means for guiding an intermediate portion of said wire that is slidably disposed to pass therethrough in a predetermined direction of movement of said wire, said guide means including a cylindrical member disposed adjacent to said opening of said cover; and
   clamping means positioned adjacent said opening of said projection between said cylindrical member of said guide means and said projection, said clamping means comprising a clamp provided on one of said projection and said cylindrical member and a bracket provided on the other of said projection and said cylindrical member, said clamp and said bracket being securely engaged by clamping said bracket with at least a tip portion of said clamp.

2. A webbing drive apparatus for a seat belt system, according to claim 1, wherein said drum assembly is comprised of an outer drum, an inner drum, a screw plate and a screw.

3. A webbing drive apparatus for a seat belt system according to claim 1, wherein said cylindrical member of said guide means is a tube.

4. A webbing drive apparatus for a seat belt system according to claim 1, further comprising a supporting means for supporting said guide means along a circumferential inner wall of said cover immediately adjacent to said top plate at an inner edge of said inner wall.

5. A webbing drive apparatus for a seat belt system, according to claim 4, wherein said supporting means is constituted by a guide groove formed in said inner wall of said cover.

6. A webbing drive apparatus for a seat belt system according to claim 4, wherein said supporting means has at least one support member which is formed in such a manner as to project from an inner wall surface of said cover.

7. A webbing drive apparatus for a seat belt system, according to claim 6, wherein said supporting member is a plate member, said supporting member is formed by bending a part of said plate member into an arcuate configuration to clamp and support said cylindrical member.

8. A webbing drive apparatus for a seat belt system, according to claim 6, wherein said supporting member is provided with a clamping and supporting portion for clamping and supporting said cylindrical member.

9. A webbing drive apparatus for a seat belt system, according to claim 8, wherein said supporting member is formed integrally with said cover.

10. A webbing drive apparatus for a seat belt system, according to claim 9, wherein said supporting member is constituted by a plate member formed separately from and secured to said cover.

11. A webbing drive apparatus for a seat belt system, according to claim 5, wherein said guide groove has a substantially arcuate section.

12. A webbing drive apparatus for a seat belt system used to drive a webbing, that is worn by a seat occupant of a vehicle, in a longitudinal direction of a vehicle so as to automatically fasten the webbing around the occupant or cancel the application thereof, comprising:
   a wire for retaining one end of said webbing;
   a drum assembly for taking up and reeling out said wire during rotation of said drum assembly so as to drive said webbing by said wire;
   a cover for said drum assembly, said cover including a top plate, a depending side wall and a projection with an opening through which said wire movably passes;
   a guide means for guiding an intermediate portion of said wire that is slidably disposed to pass therethrough in a predetermined direction of movement of said wire, said guide means including a cylindrical member disposed adjacent to said opening of said cover;
   clamping means positioned adjacent said opening of said projection between said cylindrical member of said guide means and said projection, said clamping means comprising a clamp provided on one of said projection and said cylindrical member and a bracket provided on the other of said projection and said cylindrical member, said clamp and said bracket being securely engaged by clamping said bracket with at least a tip portion of said clamp; and
   supporting means for supporting said guide means along a circumferential inner wall of said cover immediately adjacent to said top plate at an inner edge of said inner wall.

13. A webbing drive apparatus for a seat belt system according to claim 12, wherein said guide means is constituted by a tube.

14. A webbing drive apparatus for a seat belt system according to claim 13, wherein said supporting means for supporting said tube is provided on the inner wall of said cover.

15. A webbing drive apparatus for a seat belt system according to claim 14, wherein said supporting means is comprised of supporting member which has oppositely spaced portions for clamping and supporting said tube.

16. A webbing drive apparatus for a seat belt system according to claim 15, wherein said supporting member is formed integrally with said cover.

17. A webbing drive apparatus for a seat belt system according to claim 14, wherein said supporting means is constituted by a plate member formed separately from and secured to said cover.

18. A webbing drive apparatus for a seat belt system according to claim 17, wherein said plate member is bent at its end portions into an arcuate configuration to support said tube.

19. A webbing drive apparatus for a seat belt system according to claim 12, wherein said guide means is constituted by a guide groove having a substantially arcuate portion and formed along said inner wall surface on said cover.

20. A webbing drive apparatus for a seat belt system according to claim 19, wherein said guide groove has a bottom which becomes gradually shallow starting from said passage port along a wire taking-up direction.

* * * * *